United States Patent [19]

Rainey

[11] 4,207,741

[45] Jun. 17, 1980

[54] POWER SOURCE USING CYCLICALLY VARIABLE LIQUID LEVEL

[76] Inventor: Don E. Rainey, 4529 NE. 21st Ave., Ft. Lauderdale, Fla. 33308

[21] Appl. No.: 1,369

[22] Filed: Jan. 5, 1979

[51] Int. Cl.$^2$ .............................................. F03C 1/00
[52] U.S. Cl. ...................................... 60/496; 60/497; 60/503; 60/327; 290/1 R; 290/52; 417/337
[58] Field of Search ................. 60/325, 327, 398, 495, 60/496, 497, 501, 503; 290/1 R, 42, 52, 53, 54; 417/330, 331, 334, 337

[56] References Cited

U.S. PATENT DOCUMENTS

| | | | |
|---|---|---|---|
| 1,264,754 | 4/1918 | Bird | 60/503 |
| 1,364,619 | 1/1921 | Dolliver | 60/496 |
| 1,451,580 | 4/1923 | Lindenberg | 60/503 |
| 1,496,470 | 6/1924 | Knowlton | 60/503 |
| 3,084,905 | 4/1963 | Salzer | 60/503 |
| 4,083,186 | 4/1978 | Jackson | 60/503 X |

*Primary Examiner*—Edgar W. Geoghegan
*Attorney, Agent, or Firm*—Bacon & Thomas

[57] ABSTRACT

An hydraulic motor having as an energy source a cyclically controlled rising and falling level of liquid in a working tank in which is provided a piston element having a liquid-tight hollow chamber that is arranged to move vertically with the rising and falling liquid level in response to buoyant and gravitational forces acting thereon. The liquid level in the tank is varied by using a plurality of liquid-tight exchange receptacles located adjacent the tank in vertically spaced relationship between the lower and upper liquid levels in the tank, with each exchange receptacle communicating with the tank through an opening including a normally closed valve. A control means for varying the liquid level in the tank includes a system for sequentially and individually opening and closing each of the valves from the uppermost to the lowermost exchange receptacle, and vice versa. A quantity of liquid is exhausted from the working tank during each cycle of operation and a like quantity of make-up liquid is applied to the tank, the quantity of exhausted liquid being substantially smaller than the volume of the working tank. The piston chamber may selectively be filled with liquid from the tank during each cycle to increase the mass of the piston during its descent, and the liquid may be drained from the piston to increase its positive buoyancy during its ascending stroke. A system is disclosed for hydraulically locking the piston at its end of stroke positions.

11 Claims, 9 Drawing Figures

POWER SOURCE USING CYCLICALLY VARIABLE LIQUID LEVEL

TECHNICAL FIELD OF THE INVENTION

This invention relates to a power source, in the form of an hydraulic motor using the rising and falling level of liquid such as water within a working tank wherein is provided a vertically moveable piston having a liquid-tight chamber that can be selectively filled with liquid from within the tank to increase the weight of the piston, or which can be emptied of liquid to provide an air chamber to increase the positive buoyancy of the piston. The level of liquid in the tank is varied by means of a unique system utilizing vertically arranged exchange receptacles located adjacent the tank that enables the liquid level in the tank to be selectively and controllably varied between higher and lower limits in a very rapid manner with relatively low net flow of liquid through the working tank for each cycle of operation. The piston converts rising and falling liquid level to work output by rising and falling in timed relationship with the changes of liquid level in response to buoyant and gravity forces.

BACKGROUND OF THE PRIOR ART

Various hydraulic power systems employing a buoyant element or elements that cyclically move in response to rising and falling level of liquid within a receptable in which the buoyant element is located have been attempted in the prior art. Exemplary patents describing such systems include: U.S. Pat. No. 1,264,759; U.S. Pat. No. 1,451,580; U.S. Pat. No. 1,496,470 and U.S. Pat. No. 3,084,905.

Such prior art systems have certain disadvantages which the present invention overcomes. The major disadvantages of the prior art systems are that they require a substantial flow of water through the system for each cycle of operation; the power output of the system is difficult to govern; the power available during the downstroke of the buoyant element is usually smaller than during the upward stroke; the timing of power cycles is limited by the length of time required to fill an empty receptable to vary the level of liquid therein; and multiple buoyant elements arranged to operate in timed relationship are generally required for efficient sustained operation.

TECHNICAL ADVANTAGES OF THE INVENTION

The present invention overcomes the disadvantages of prior art hydraulic motor systems of the type referred to above because of the use of vertically arranged liquid storage receptacles adjacent the main working tank that enables the liquid level in the main tank to be rapidly and controllably varied between upper and lower limits, which limits may be selectively controlled. Very little net flow of liquid through the working tank is required and the power output can be easily governed by varying the liquid level changes at the rate at which the changes take place. In addition, the moveable power element in the invention is a piston that can be selectively and cyclically converted from an element having great positive buoyancy to a massive weight element capable of generating downward forces, wherevy both upward and downward strokes of the piston can be utilized to generate substantial work. Since rapid cycles are possible using the vertically arranged multiple exchange receptacles, greater work over a period of time can be achieved per single working tank.

Other advantages and improvements over prior art hydraulic motor systems will be apparent from the following description of a preferred exemplary embodiment of the invention.

DETAILED DESCRIPTION OF PREFERRED EMBODIMENT OF THE INVENTION

Description of the Drawings

With reference to the appended drawings.

DETAILED DESCRIPTION OF PREFERRED EMBODIMENT

Figure 1:
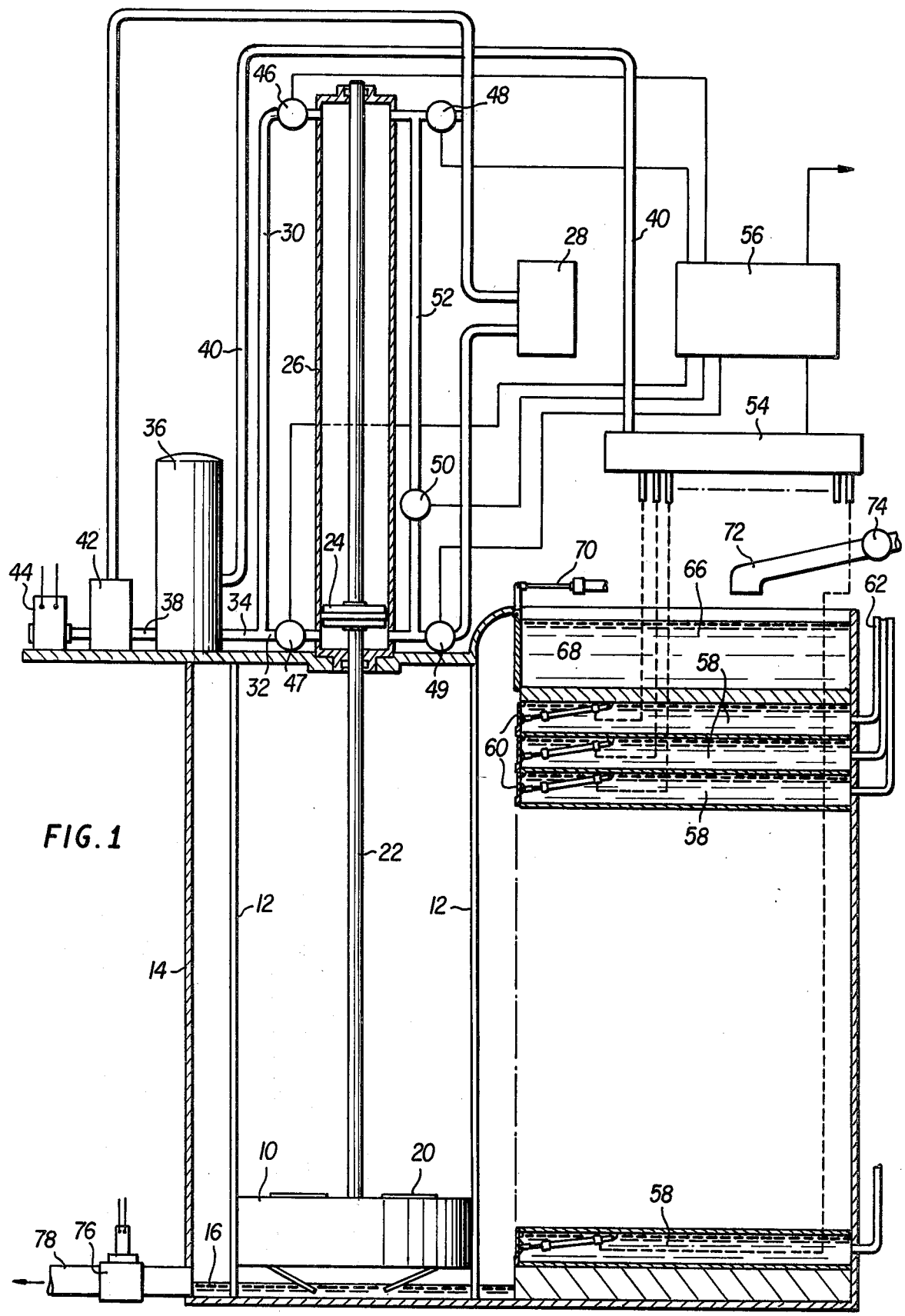
FIG. 1 shows schematically in an elevational and partially sectional view a power generating system embodying the present invention.
Figure 3:
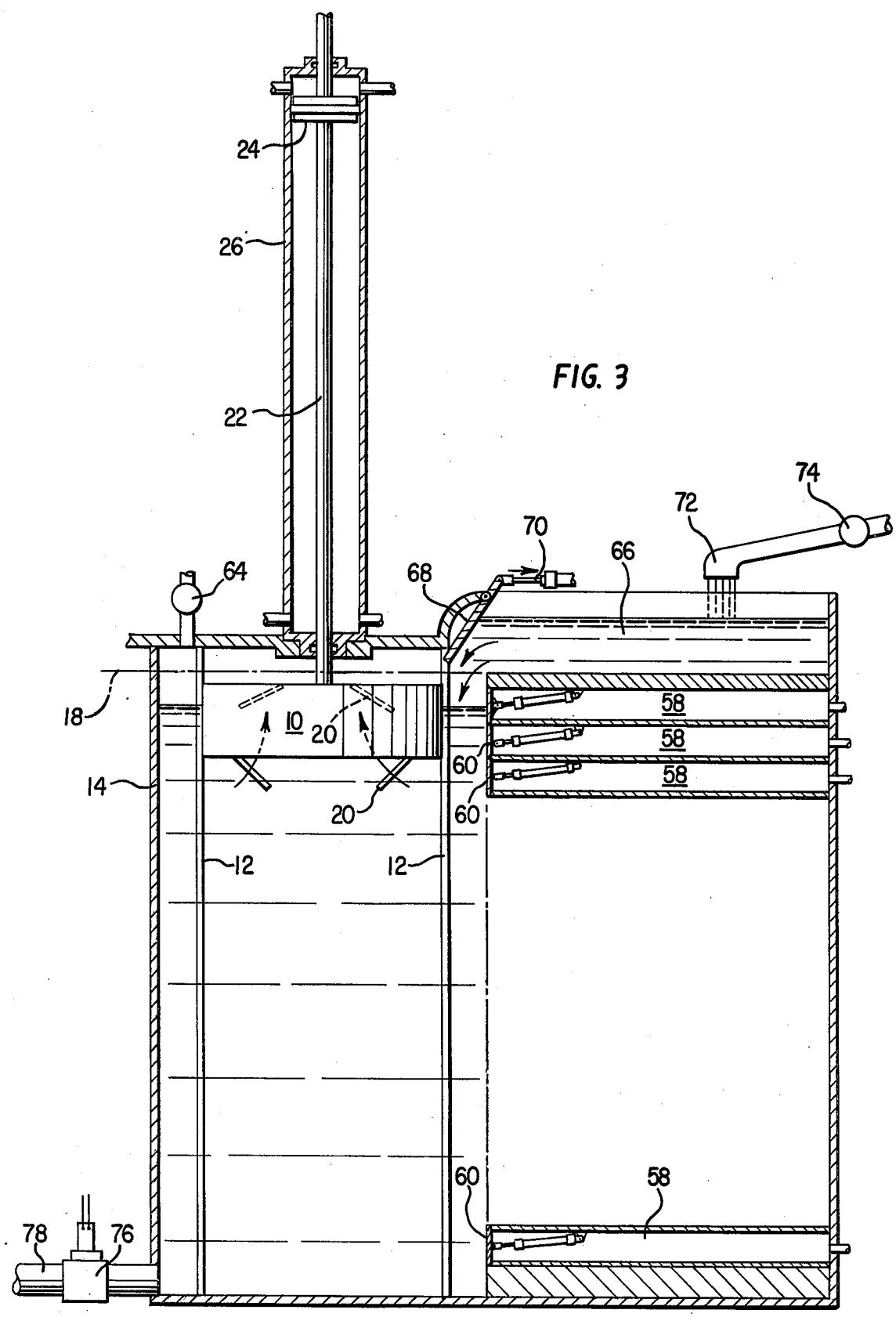

With reference to the appended drawings, and particularly FIG. 1, a power generating system includes a vertically moveable piston 10 mounted between vertical guides 12 within working tank 14 that is essentially fluid-tight and is capable of holding a liquid such as water, the liquid level varying between a lower level 16, as illustrated and an upper level 18 as shown by the dotted line in FIG. 3.

The piston 10 includes a water tight chamber therein, access to which is obtained through valves 20, which permit the chamber to be selectively filled with liquid from the tank 14, or drained of such liquid. As shown in FIG. 1, the piston 10 is at its lower end of stroke position, and valves 20 beneath the chamber within the piston 10 have been opened to drain the chamber.

The piston 10 is connected by means of a piston rod 22 to the piston 24 of an hydraulic pump in the form of an hydraulic ram. The cylinder 26 of the pump is filled with an appropriate hydraulic fluid from a reservoir or sump 28. On its upward stroke, piston 24 will therefore drive hydraulic fluid under pressure through conduit 30 and on its downward stroke will drive such hydraulic fluid through conduit 32, these conduits merging into output conduit 34 which leads to accumulator 36, which stores hydraulic pressure in a conventional manner. From accumulator 36, output conduits 38 and 40 provide pressurized hydraulic fluid for driving a motor 42 or for actuating other system components, respectively.

Motor 42 is utilized, for example, to drive an electrical alternator or generator system represented by element 44. The output of element 44 is utilized as a source of electrical energy, although it will be understood that the shaft output of motor 42 itself could be used as a source of rotational energy.

Various valve elements 46–50 are provided to control the motion and output of the ram piston 24. Valves 46 and 47 respectively control the output of hydraulic fluid from the cylinder 26 to the output line 34. Valves 48 and 49 control the flow of hydraulic fluid between cylinder 26 and sump 28. Valve 50 in a bypass conduit 52 is capable of controlling the rate of motion of piston 24 independently of the control function exercised by the other valves.

If hydraulic pressure generated by the piston and cylinder combination 24-26 is desired to operate other system components, such pressurized fluid may be tapped from the accumulator or from any other pressurized source in the system. In this instance, an exemplary illustration is shown whereby a manifold 54 is supplied with pressurized hydraulic fluid through line 40, such manifold controlling the distribution of such fluid, at any desired pressure level, throughout the system. The entire operation of the valves, the motor 42, the electrical generating system 44, and the manifold 54 is all controlled from a central control station 56. The controls, of course, may be electrical, hydraulic or pneumatic, and may even be remotely controlled by radio signals or the like. Preferably, the control station 56 would be in the form of a control room where appropriate record keping and monitoring facilities would also be provided. While hydraulic fluid is shown being supplied to manifold 54 for distribution throughout the system embodying the invention, this is suggested by way of an example. If it were desired, hydraulic fluid in line 40 could be utilized to drive an air compressor for supplying compressed air to manifold 54 for utilization in the system for control or actuation of various system components. In some instances, it might be more practical to utilize electrically actuated controls and actuator elements, but the use of such elements shall depend upon the environment in which the system is used and the availability of such forms of energy.

Adjacent the tank 14 are provided a vertically stacked group of exchange receptacles 58 that are disposed between the lower and upper levels of liquid in the tank 14. Each exchange receptacle 58 is isolated from the interior volume of tank 14 by means of a double door flapper valve 60 that will be described in more detail below. For purposes of this description, the volume of the working tank 14 is understood to comprise that volume contained within outer walls shown at 14 and the valves 60. While the exchange receptacles 58 are shown contiguous to the tank 14, they could just as well be located in spaced relationship with respect to the tank, and connected thereto through hydraulic conduits having appropriate control valves in the conduits. Suitable vents 62, 64 (see FIG. 2) are provided to vent the exchange receptacles 58 and the working tank 14, respectively, to ambient.

A reservoir receptacle 66 is provided at an elevated level above tank 14, and includes a suitable gate valve 68 and a control element 709 whereby the liquid contents of reservoir 66 can be selectively discharged into the tank 14 from an upper level. For reasons that will become apparent later, the volumetric capacity of reservoir 66 should be at least equal to the volume of the piston chamber plus whatever volume is required to make up for liquid that is periodically discharged from the tank 14 when the liquid level therein is lowered to its lowermost level 16 (FIG. 1). Make-up liquid is supplied to reservoir 66 through a make-up liquid conduit 72 that is provided with a suitable control valve 74. The valve 74, like the other valves in the system, is connected in an appropriate manner to the control unit 56 so that its operation can be controlled and monitored to enable make-up liquid to be supplied to reservoir 66 on a cyclically timed basis.

Assuming for the moment that the valves 60 between exchange receptacles 58 and working tank 14 can be sequentially and cyclically operated between the uppermost and lowermost exchange receptacles, and vice versa, and assuming that all of the exchange receptacles 58 are initially filled with liquid, with the lower liquid level in tank 14 at or near the level shown at 16, it will be evident that as the valves 60 are opened one at a time beginning with the lowermost exchange receptacle 58 and proceeding upwardly, the liquid level within tank 14 will rise up to a maximum level when the uppermost receptacle 58 is emptied into the tank 14. It should be noted that the lower level of liquid in receptacle 14 is below the lowermost exchange receptacle 58 and that as each exchange receptacle 58 sequentially empties into the tank 14, the liquid level never rises above the bottom of the exchange receptacle that is being emptied into the tank 14. To enable this to occur, the lower level of liquid 16 is below the lowermost reecptacle 58 by a distance that corresponds roughly to the increase in liquid level that occurs in tank 14 when the lowermost receptacle 58 is emptied into the tank. Of course, each receptacle 58 is immediately closed and sealed against inflow of liquid after it has discharged into the tank 14.

The piston 10, as shown in FIG. 1, has been drained of liquid and will be then sealed so as to be essentially liquid-tight. In addition, the piston is hydraulically locked in its lowermost position by closing valves 46-50 until the liquid level in tank 14 rises above piston 10. Piston 10 may thereafter be released for controlled ascent upon opening valve 46-50 due to the buoyancy forces acting thereon while the liquid level continues to rise towards its upper limit. While the piston is rising, hydraulic fluid above the ram piston 24 is pressurized and is available to produce work, such as by driving motor and electrical generators 42, 44 respectively.

Figure 2:
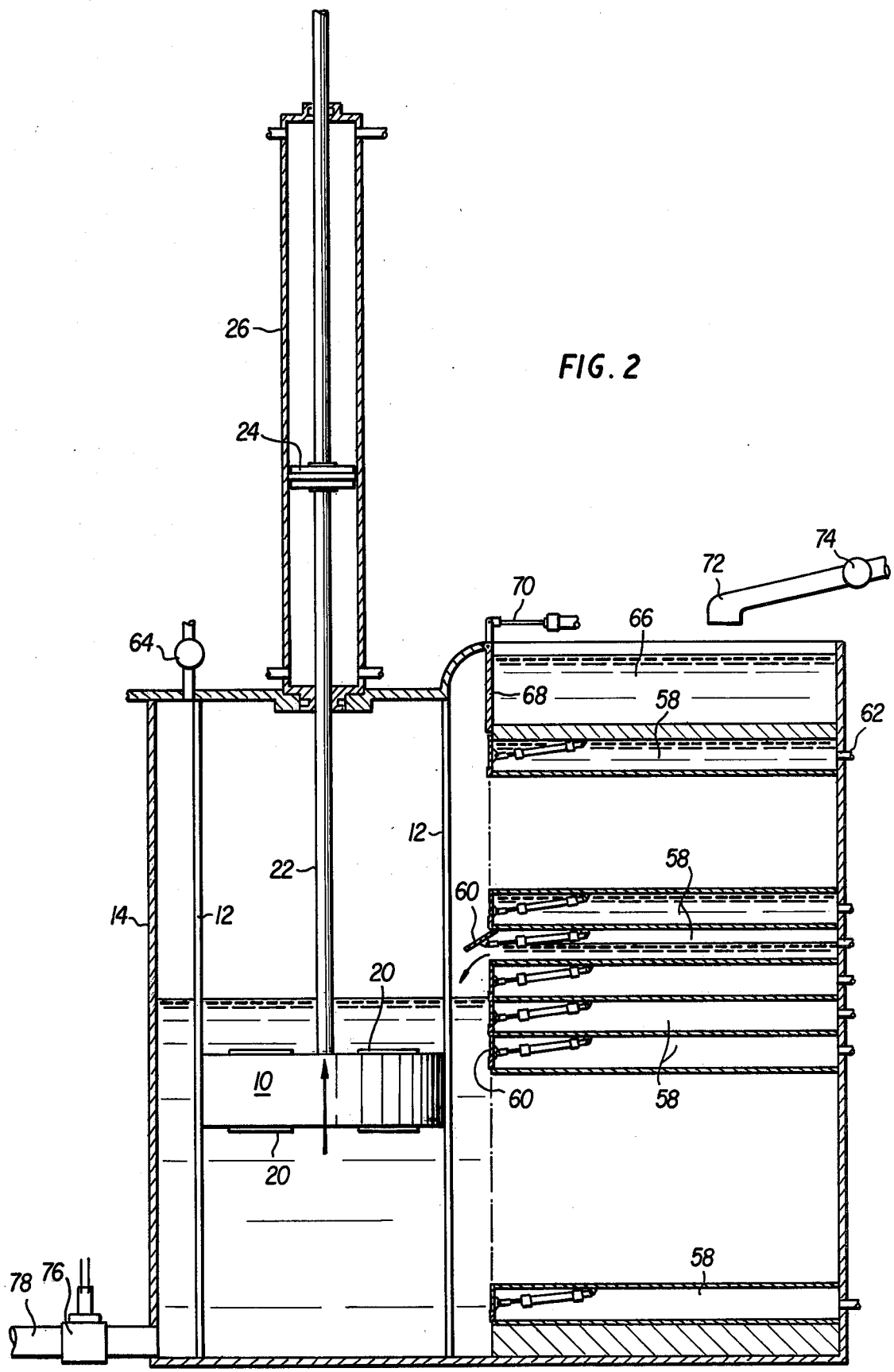
FIGS. 2–4 shows the system in various operational stages.

As shown in FIG. 2, piston 10 is ascending due to buoyancy forces acting thereon equivalent to the displacement of the piston, less the gravitational weight of the piston and its associated structure. In FIG. 3, the liquid level has not yet reached its maximum level at 18, but the uppermost exchange receptacle 58 has been emptied and reclosed. Make-up liquid must now be added to bring the liquid level up to its uppermost level 18 above piston 10 and sufficient liquid must be provided to fill the piston 10 through valves 20 that are opened when the piston reaches its end of stroke position. Make-up liquid comes from reservoir 66, which is placed in communication with the interior of tank 14 through the valve 68. Additional make-up liquid is shown being admitted to reservoir 66 through the pipe 72. At this point, the tank 14 contains its maximum volume of liquid and the exchange receptacles 58 are empty.

The valve 68 is then closed, while reservoir 66 is brought back to its full level and the piston 10 is locked in its upper position as shown in FIG. 3, only with the valves 20 sealed in their closed position.

The liquid level in tank 14 is lowered by sequentially opening and closing valves 60 between tank 14 and exchange receptacles 58 beginning with the uppermost receptacle 58 and proceeding to the lowermost receptacle. As this happens, the liquid level within tank 14 will progressively drop until it is below the piston 10.

Figure 4:
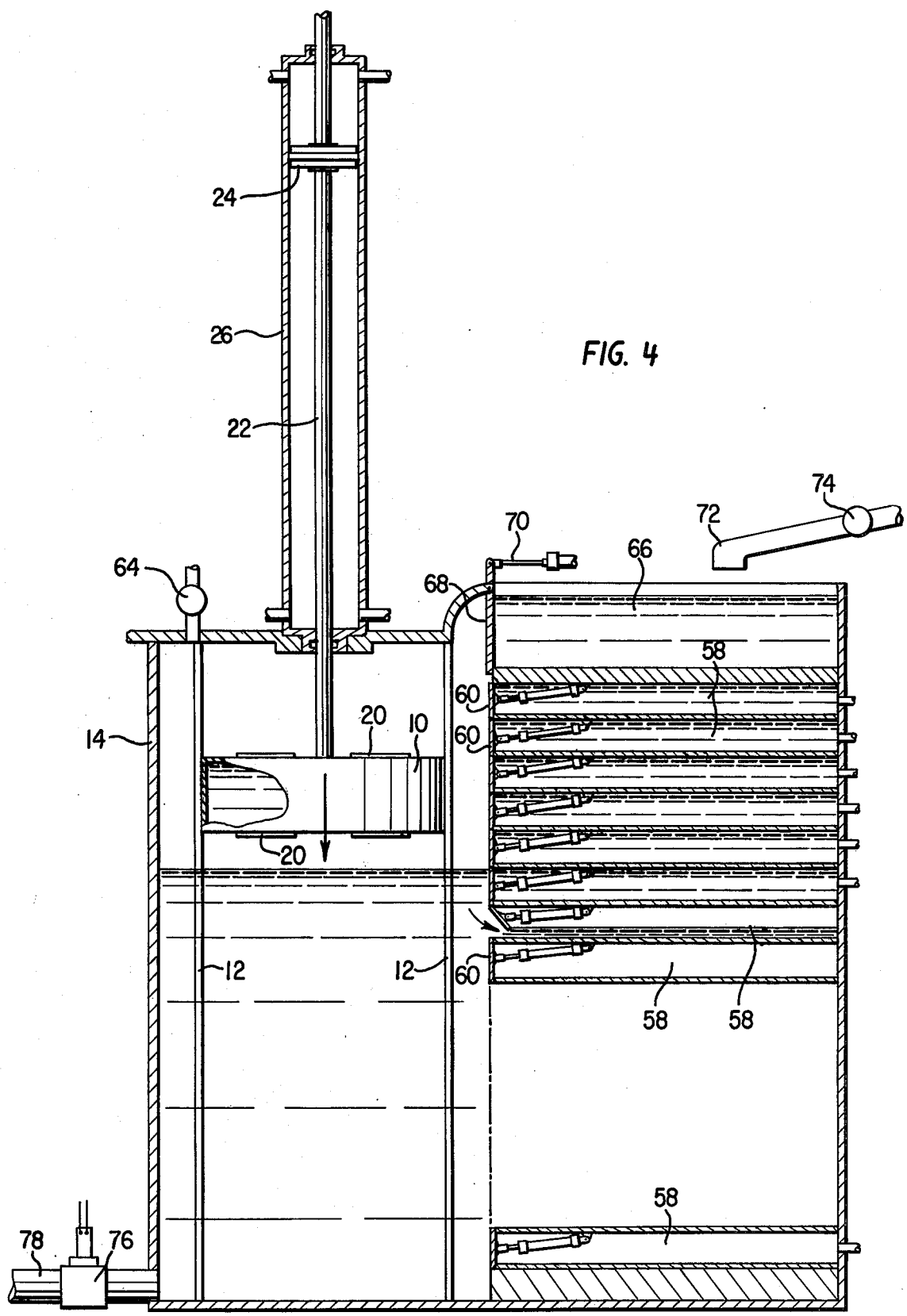

As seen in FIG. 4, the liquid level in tank 14 has dropped below the piston 10 and the filled piston which now has a massive weight due to its liquid content, is permitted to drop in air while generating hydraulic pressure beneath piston 24. It will be observed that as each receptacle 58 is progressively placed in communication with the tank 14, a volume of liquid is transferred from tank 14 to the receptacle 58 that is in communication with the tank 14. However, the liquid level never drops below the upper surface of the respective receptacle 58 that is in communication with the tank 14. The volume of each receptacle 58 and the volume of the tank 14 is arranged so that this relationship is maintained.

In FIG. 4, the liquid level has been permitted to drop below the piston 10 in tank 14 and one of the exchange receptacles 58 is shown as it begins to be filled with liquid from tank 14. Preferably, when the receptacle 58 is filled, the liquid level in tank 14 will be at approximately the top of the receptacle 58 that is illustrated as being opened to the interior of the tank. When the lowermost receptacle 58 has been opened and closed again so that it is filled with liquid from the tank 14, the liquid level within the tank should be at approximately the top end of the lowermost receptacle. At that point, the piston will be at approximately the bottom of its stroke substantially as shown in FIG. 1.

The end of the cycle occurs when the valve 76 is opened and places outlet line 78 in communication with the interior of tank 14. At the same time, valves 20 in piston 10 are opened to drain liquid from the latter. Valve 76 is opened until the liquid within tank 14 has reached its lower level, approximately as shown at 16 in FIG. 1. This drops the liquid level within the tank 14 below the lowermost receptacle 58 to such extent that, when the liquid in the lowermost receptacle 58 is drained into the tank 14, the liquid level will lie at approximately the same level as the bottom of the lowermost receptacle 58.

With the liquid level at its lower limit 16, all of the receptacles 58 are filled with liquid, and the cycle is ready to be repeated. As a practical matter, unless some means are provided to fill each of the exchange unless receptacles with liquid before beginning the first cycle, it is convenient to begin the cycle with the exchange receptacles all empty and the tank 14 filled with liquid to its upper limit, with the piston 10 full of liquid. Thereafter, only make-up fluid need be added to reservoir 66 to make-up for that amount of liquid that is drained from tank 14 through outlet pipe 78 during each cycle of operation.

Figure 5:
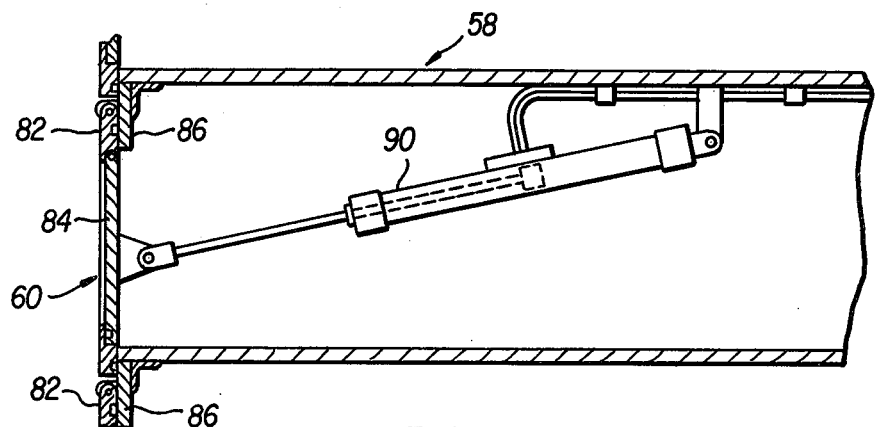
FIGS. 5–8 show details of the valves between the exchange receptacles and the main working tank of the system.
Figure 6:
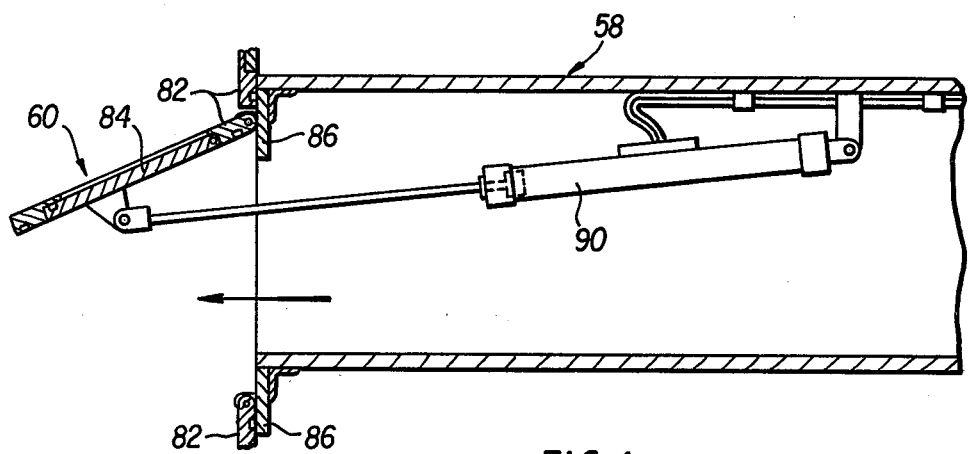
Figure 7:
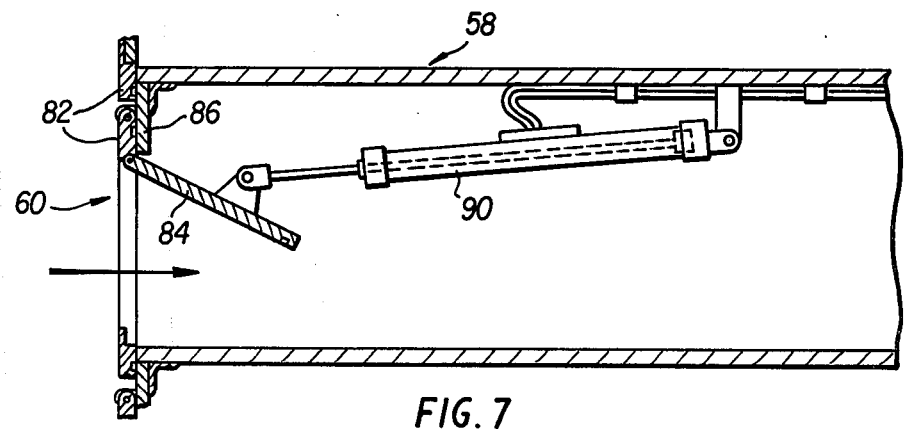
Figure 8:
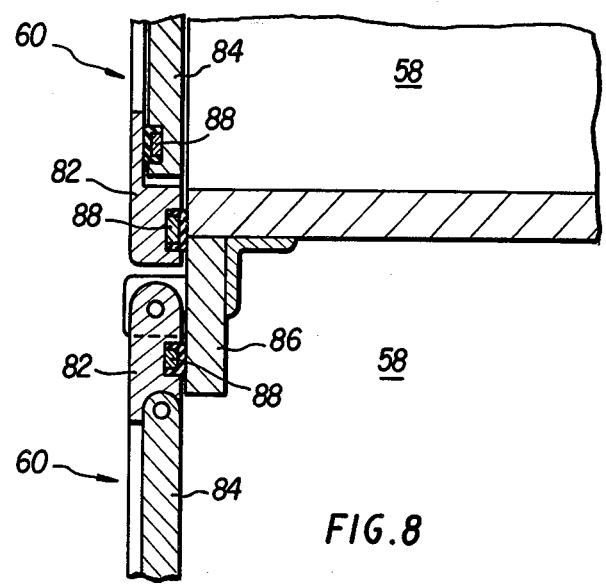

In FIGS. 5 to 8, the double-door flapper valves 60 are described in more detail, along with an exemplary actuator system for the valves. Each valve 60 comprises a double-door flapper valve including a pair of door elements 82, 84, the door element 82 being pivotally attached to a stringer 86 secured to the top of receptacles 58. Inner door element 84 in turn is pivotally secured to the outer door element 82 in such a manner that it can pivot only inwardly into the receptacle 58, as shown in FIG. 7. When a force is applied to the inner door element 84 towards the left as shown in FIGS. 5-7, it will be pressed against the outer door element 82 to cause both door elements to pivot outwardly about the upper hinge point of the outer door element 82. Suitable magnetic elements are provided about the periphery of the doors, along with resilient sealing elements 88 (FIG. 8) to prevent liquid leakage past the doors, including the hinge areas. A suitable actuator such as hydraulic actuator 90 is provided for controllably opening and closing the valves 60 by pushing or pulling on door element 84. Because of the magnetic attraction between the inner and outer door elements, a pulling force on the inner door element will cause the outer door element to move therewith towards the closed position. In actuality, only a very light actuating force is required for the doors due to the fact that liquid within receptacle 58 always tends to push the door outwardly when the receptacle is filled with liquid, and there is normally no resistance to the closing motion of the doubledoor elements 82, 84. When the receptacles 58 are empty and the doors must be opened against the weight of liquid within tank 14, it will be seen that applications of force towards the left as viewed in FIGS. 5-7 results in the outer door elements 84 being positively driven towards the open position to permit the receptacles 58 to be filled. Of course, once the receptacles are filled, there is virtually no resistance to the closing motion of the door elements 82, 84, so that the magnetic attraction between the doors is sufficient to permit them to be returned to their normally closed position through the application of a very light actuating force.

The actuators 90 can be controlled from the central control unit 56 through the manifold 54. Actuators 90 are illustrated as being hydraulically actuated, since hydraulic pressure is always available from accumulator 36 while the system is operational. However, it should be appreciated that actuators 90 could be electrical, mechanical, hydraulic or any other suitable device that is capable of sequentially opening and closing the valve 60 from the uppermost to the lowermost receptacle, and vice versa. The actuators 90 are shown mounted within the receptacles 58, but suitable actuators could just as well be located outside of the receptacles, including within the tank 14 or even outside of both receptacles 58 and the tank 14.

The receptacles 58 and the tank 14 are illustrated in the form of a unitary assembly wherein the volume of the tank 14 is defined at least in part by the solid wall presented by the valves 60. That is, receptacles 58 and the tank 14 share a common wall in the form of the flapper valve 60 that open directly into the receptacles and the tank. However, it should be understood that all of the receptacles could be located entirely separate from the tank 14 with a suitable conduit providing communication between each receptacle 58 and the tank 14. A suitable valve associated with each conduit would be required to control flow of liquid between the exchange receptacles and the tank 14. Furthermore, although the exchange receptacles are shown stacked one atop the other, the only requirement is that the receptacles be spaced in vertical relationship with respect to each other between the upper and lower liquid levels in the tank 14.

Figure 9:
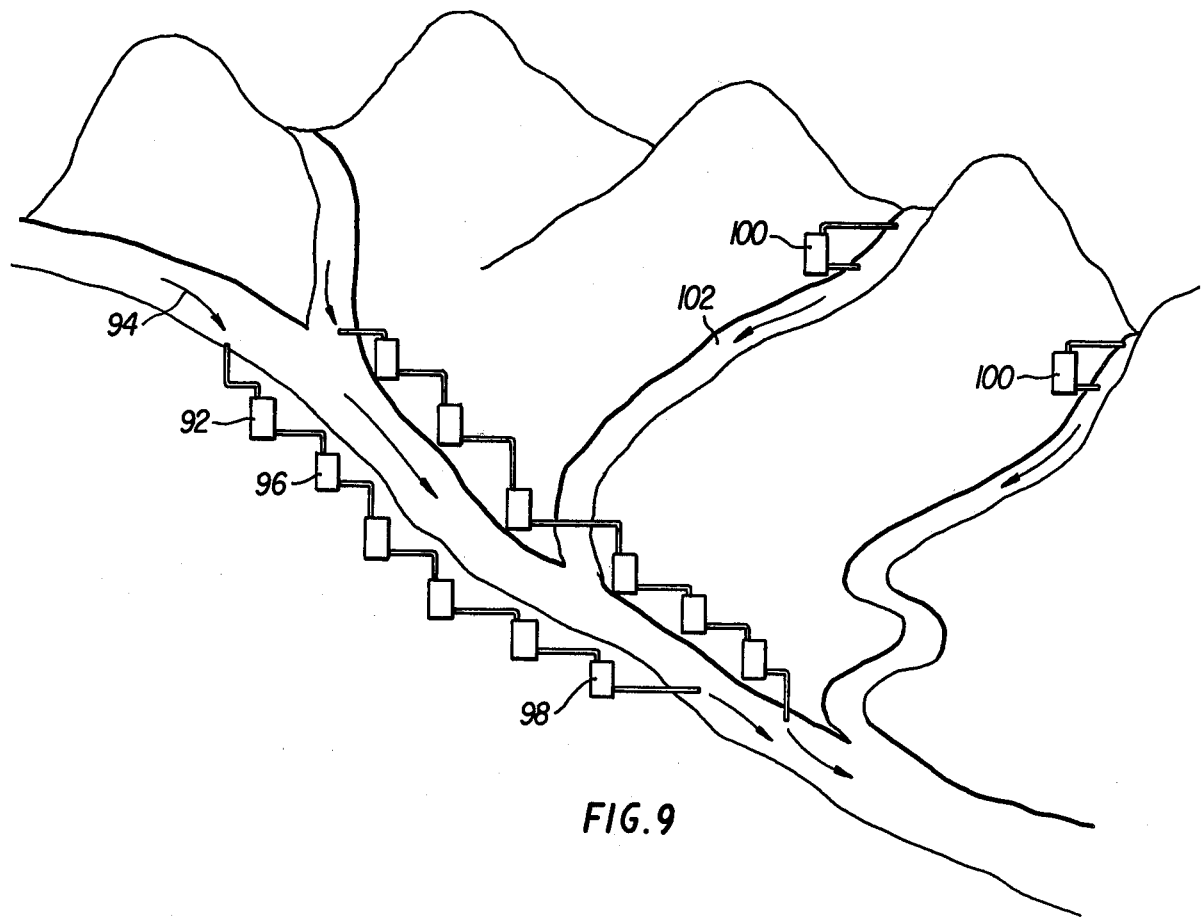
FIG. 9 shows how multiple systems can be used together in a natural environment.

With reference to FIG. 9, a plurality of power sources constructed in accordance with FIG. 1 are illustrated as being vertically spaced with respect to each other adjacent a moving body of water such as a river and its tributaries. The vertical spacing of the tank and receptacle systems permit make-up liquid for the uppermost tank 92 to be drawn from the river 94, while the liquid exhausted from the tank 92 can be utilized by the downstream tank 96 as its make-up liquid. The exhausted liquid from tank 96 in turn can be utilized as the make-up liquid for the next tank therebelow, and this can progress to the most downstream tank 98. The tank 98 exhausts it liquid back into the river 94. The tank systems 100 are shown being utilized as individual units arranged to draw make-up liquid from a point on a stream 102 that is higher than the tank so that no pumping energy is required to supply make-up liquid to the tank unit 100. The tank 100 exhausts its liquid back into the stream 102. One can observe that with the system shown in FIG. 9, no outside energy is required to vary the liquid level within the tank or each system and, once the tanks have been initially filled with water from the streams and rivers, the net flow or water through the tank systems is quite small, since only a relatively small amount of make-up water is required during each cycle of operation.

A system embodying the present invention thus can serve as a substantial source of power in the form of electrical energy or any other suitable form compatible with reciprocal motion of the piston utilized to convert varying liquid level into reciprocal motion. A unique advantage of the invention is that the periodic cycle of operation of the system can be varied to suit any power requirement compatible with the environment in which the system is located and compatible with the availability of make-up liquid. The opening and closing of the valves vetween the exchange receptacles and the tank 14 can be varied even while the system is operating to govern the work output of the system. If liquid at a suitable elevation is available, make-up liquid can be supplied to the tank of the system without any pumping requirements or comsumption of external energy. If pneumatic or mechanical actuators are used for the flapper valves, as well as for the valves associated with the piston, there is virtually no risk of contamination of the liquid flowing through the system. The differential level of liquid in tank 14 can be varied selectively by controlling the number of valves 60 that are actuated during the cycle to control the length of stroke of the piston 10. Exhausting of liquid from the tank 14 and supply of make-up liquid, of course, would be controlled in timed relationship with any desired piston stroke.

It will be apparent to those skilled in the art that various modifications to the preferred embodiment can be made within the spirit and scope of the disclosed invention, which is intended to be limited only by the claims below.

What is claimed is:

1. A power using the rising and falling level of liquid such as water including:
   A. A working tank capable of holding liquid between upper and lower liquid levels;
   B. A piston having a liquid-tight hollow chamber in the working tank arranged to move vertically up and down within the tank;
   C. Means for converting vertical motion of the piston into useful power;
   D. Means for varying the liquid level in the tank comprising:
      (a) a plurality of liquid-tight exchange receptacles adjacent the tank extending in vertically spaced relationship between the lower and upper liquid levels in the working tank, each exchange receptacle communicating with the tank through an opening including a normally closed valve;
      (b) means for controlling opening and closing of said valves individually and sequentially from the uppermost to the lowermost exchange receptacle, and vice versa;
   E. Means for supplying working liquid into the working tank from a source external of the working tank and separate from said exchange receptacles; and
   F. Means for selectively exhausting liquid from a lower region of the working tank corresponding with the lower level of liquid within the tank.

2. A power source according to claim 1, said piston including valves for providing communication between said chamber and the working tank interior, and means for locking the piston at its stroke extremities.

3. A power source according to claim 2, said means for converting vertical motion of the piston into useful work comprising an hydraulic ram, and said locking means for the piston comprising a system for hydraulically locking the moveable part of the ram against motion.

4. A power source according to claim 1, said excahnge receptacles lying adjacent one wall of the working tank and being vertically stacked one above the other.

5. A power source according to claim 1, said means for supplying working liquid into the working tank including a reservoir chamber near the upper end of the working tank above the upper liquid level.

6. A power source according to claim 4, said valves comprising hinged, double-door flapper valves extending substantially the full width and height of the area providing communication between said receptacles and the tank, said valves opening directly into said working tank and exchange receptacles.

7. A method for producing power using a controlled rising and falling level of liquid within at least a single working tank containing a vertically moveable piston having liquid-tight chamber comprising:
   A. Providing a vertically spaced series of liquid receptacles adjacent at least one working tank, the receptacles individually communicating with the tank through openings including respective controllable, normally closed valves, said receptacles extending between upper and lower liquid levels in the tank;
   B. Initially filling the tank with liquid, with the receptacles empty or substantially empty of liquid;
   C. Progressively and sequentially opening and closing each valve between the tank and a receptacle one at a time from the uppermost to the lowermost receptacle to fill each receptacle sequentially from the uppermost to the lowermost with liquid from the tank to lower the liquid level in the tank;
   D. Exhausting additional liquid from the tank to drop the liquid level below the lowermost receptacle;
   E. Progressively and sequentially opening and closing each valve between the tank and a receptacle one at a time from the lowermost to the uppermost receptacle to empty each receptacle of liquid sequentailly from the lowermost to the uppermost, the liquid from each receptacle flowing into the tank raising the liquid level therein;
   F. Adding make-up liquid to the tank to bring the liquid level back to its initial level;
   G. Permitting the piston to fall and rise in response to gravitational and buoyant forces in timed relationship with the falling and rising level of liquid in the tank; and
   H. Using the vertical piston motion to produce useful work.

8. A method for producing power according to claim 7, including
   arranging a plurality of working tanks and associated exchange tanks in vertically spaced relationship and connected together by conduits so that liquid exhausted from each tank flows into the next lower tank;

providing a source of make-up liquid for the uppermost tank;

using the liquid exhausted from each tank as make-up liquid for the next lower tank;

synchronizing operation of the tanks so that the make-up liquid for each tank reaches its respective tank in proper timed relationship with its own internal operation, that is, in time to enable such make-up liquid to be added to the respective tank to bring its liquid level back to its initial level, as recited in step F of claim 8.

9. The method according to claim 7 or 8, wherein valves for permitting filling and emptying of the piston chamber with liquid in the tank are provided as well as a locking system for locking the piston at its end of stroke position, including fillig the piston chamber with liquid when it is at or near its upper position, locking the piston at its upper position until the liquid level in the tank drops below the piston, then releasing the filled piston to fall in air at a controlled rate of descent while the liquid level in the tank is caused to remain below the descending piston.

10. The method according to claim 9, including locking the piston at its lower position, emptying the piston chamber and sealing same to prevent ingress of liquid while the liquid is at or near its lower level in the tank, causing the liquid level in the tank to rise above the piston by sequential opening of the valves betwen the tank and exchange receptacles, and releasing the piston for controlled ascent by buoyancy forces while it remians totally submerged in liquid in tank 14.

11. A power source using the rising and falling level of liquid such as water including:

A. A plurality of working tanks capable of holding liquid between upper and lower liquid levels, the tanks being located in vertically spaced relationship;

B. A piston having a liquid-tight hollow chamber in each working tank arranged to move vertically up and down within each tank;

C. Means for converting vertical motion of each piston into useful power;

D. Means for varying the liquid level in each tank comprising:
   (a) a plurality of liquid-tight exchange receptacles adjacent the tank extending in vertically spaced relationship between the lower and upper liquid levels in the tank, each exchange receptacle communicating with the tank through an opening including a normally closed valve;
   (b) means for controlling opening and closing of said valves individually and sequentially from the uppermost to the lowermost exchange receptacle, and vice versa;

E. Means for supplying working liquid into uppermost tank from a source external of said uppermost tank and separate from its respective exchange receptacles;

F. Means for selectively exhausting liquid from a lower region of each tank corresponding with the lower level of liquid within the tank;

G. Conduit means for enabling liquid exhausted from each tank except the lowermost to flow into the lower working tank, including flow control means in said conduit means.

* * * * *